(12) United States Patent
Lin

(10) Patent No.: US 9,038,178 B1
(45) Date of Patent: May 19, 2015

(54) DETECTION OF MALWARE BEACONING ACTIVITIES

(75) Inventor: Derek Lin, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 77 days.

(21) Appl. No.: 13/532,385

(22) Filed: Jun. 25, 2012

(51) Int. Cl.
| | |
|---|---|
| G06F 12/14 | (2006.01) |
| G06F 17/00 | (2006.01) |
| H04L 29/06 | (2006.01) |
| H04L 9/32 | (2006.01) |
| G06F 15/173 | (2006.01) |

(52) U.S. Cl.
CPC ............ *H04L 63/1416* (2013.01); *H04L 63/02* (2013.01)

(58) Field of Classification Search
USPC ........ 726/23, 11, 13; 713/153, 154, 168, 170; 709/224, 225
See application file for complete search history.

(56) References Cited

U.S. PATENT DOCUMENTS

| | | | |
|---|---|---|---|
| 5,278,901 A | 1/1994 | Shieh et al. | |
| 6,282,546 B1 | 8/2001 | Gleichauf et al. | |
| 6,301,668 B1 | 10/2001 | Gleichauf et al. | |
| 6,324,656 B1 | 11/2001 | Gleichauf et al. | |
| 6,415,321 B1 | 7/2002 | Gleichauf et al. | |
| 6,484,315 B1 | 11/2002 | Ziese | |
| 6,487,666 B1 | 11/2002 | Shanklin et al. | |
| 6,499,107 B1 | 12/2002 | Gleichauf et al. | |
| 6,567,917 B1 | 5/2003 | Ziese | |
| 6,578,147 B1 | 6/2003 | Shanklin et al. | |
| 6,597,957 B1 | 7/2003 | Beakley | |
| 6,609,205 B1 | 8/2003 | Bernhard et al. | |
| 6,704,874 B1 | 3/2004 | Porras et al. | |
| 6,708,212 B2 | 3/2004 | Porras et al. | |
| 6,711,615 B2 | 3/2004 | Porras et al. | |
| 6,775,657 B1 | 8/2004 | Baker | |
| 6,785,821 B1 | 8/2004 | Teal | |
| 6,792,546 B1 | 9/2004 | Shanklin et al. | |
| 6,816,973 B1 | 11/2004 | Gleichauf et al. | |
| 6,880,087 B1 | 4/2005 | Carter | |
| 6,954,775 B1 | 10/2005 | Shanklin et al. | |
| 6,968,377 B1 | 11/2005 | Gleichauf et al. | |
| 7,047,423 B1 | 5/2006 | Maloney et al. | |
| 7,130,466 B2 | 10/2006 | Seeber | |
| 7,140,041 B2 | 11/2006 | Jeffries et al. | |
| 7,146,305 B2 | 12/2006 | van der Made | |
| 7,162,649 B1 | 1/2007 | Ide et al. | |
| 7,178,166 B1 | 2/2007 | Taylor et al. | |
| 7,237,264 B1 | 6/2007 | Graham et al. | |
| 7,340,776 B2 | 3/2008 | Zobel et al. | |
| 7,353,511 B1 | 4/2008 | Ziese | |

(Continued)

OTHER PUBLICATIONS

Djidjev et al, "Graph-Based Traffic Analysis for Network Intrusion Detection", Los Alamos National Laboratory Associate Directorate for Theory, Simulation, and Computation (ADTSC) LA-UR 10-01992, 2010, pp. 84-85.

(Continued)

*Primary Examiner* — Aravind Moorthy
(74) *Attorney, Agent, or Firm* — Van Pelt, Yi & James LLP (57) ABSTRACT

Malware beaconing activity detection is disclosed, including: monitoring a plurality of conversations between an internal device and one or more external destinations; extracting feature sets based at least in part on the plurality of conversations; and determining that a conversation of the plurality of conversations is anomalous based at least in part on the extracted feature sets.

18 Claims, 6 Drawing Sheets

(56) References Cited

U.S. PATENT DOCUMENTS

| | | |
|---|---|---|
| 7,370,360 B2 | 5/2008 | van der Made |
| 7,403,980 B2 | 7/2008 | Stringer-Calvert et al. |
| 7,409,721 B2 | 8/2008 | Hernacki et al. |
| 7,412,724 B2 | 8/2008 | Baum-Waidner et al. |
| 7,437,762 B2 | 10/2008 | Dacier et al. |
| 7,454,790 B2 | 11/2008 | Potok |
| 7,480,712 B2 | 1/2009 | Moy |
| 7,499,590 B2 | 3/2009 | Seeber |
| 7,530,105 B2 | 5/2009 | Gilbert et al. |
| 7,565,549 B2 | 7/2009 | Satterlee et al. |
| 7,574,740 B1 | 8/2009 | Kennis |
| 7,594,260 B2 | 9/2009 | Porras et al. |
| 7,624,448 B2 | 11/2009 | Coffman |
| 7,634,800 B2 | 12/2009 | Ide et al. |
| 7,873,046 B1 | 1/2011 | Seshadri |
| 7,917,393 B2 | 3/2011 | Valdes et al. |
| 8,578,497 B2 | 11/2013 | Antonakakis et al. |
| 8,826,438 B2 | 9/2014 | Perdisci et al. |
| 2005/0027981 A1 | 2/2005 | Baum-Waidner et al. |
| 2006/0010252 A1* | 1/2006 | Miltonberger et al. ........ 709/245 |
| 2006/0028996 A1* | 2/2006 | Huegen et al. ................ 370/252 |
| 2006/0069912 A1 | 3/2006 | Zheng et al. |
| 2007/0209074 A1 | 9/2007 | Coffman |
| 2007/0209075 A1 | 9/2007 | Coffman |
| 2007/0226796 A1 | 9/2007 | Gilbert et al. |
| 2008/0046393 A1 | 2/2008 | Jajodia et al. |
| 2008/0086551 A1 | 4/2008 | Moy |
| 2009/0126003 A1* | 5/2009 | Touboul ........................ 726/13 |
| 2009/0260083 A1* | 10/2009 | Szeto et al. .................. 726/22 |
| 2012/0173710 A1* | 7/2012 | Rodriguez .................... 709/224 |

OTHER PUBLICATIONS

Staniford-Chen et al, "GrIDS—A Graph Based Intrusion Detection System for Large Networks", 1996.

* cited by examiner

Step 1

Step 2

Step 3

| 602 | 604 Internal device | 606 External IP address | 608 #hosts | 610 interTime | 612 #conn | 614 final risk | 616 IP country |
|---|---|---|---|---|---|---|---|
| | iigosxs.corp.emc.com | 208.29.69.179 | 235 | 0:00:30 | 57 | 9.39 | US |
| | usxxriedel9d1c.corp.emc.com | 208.29.69.179 | 235 | 0:00:30 | 60 | 9.39 | US |
| | CNRDWUG1L2C.corp.emc.com | 222.141.53.2 | 65 | 0:02:30 | 74 | 8.73 | China |
| | Mario-MAC-EMC.corp.emc.com | 222.141.53.2 | 65 | 0:02:30 | 46 | 8.73 | China |
| | CNTGBAORL2C.corp.emc.com | 222.141.53.2 | 65 | 0:02:30 | 39 | 8.45 | China |
| | AG-VM-01-W7.corp.emc.com | 222.141.53.2 | 65 | 0:02:30 | 66 | 8.45 | China |
| | USENDOUG1D11.corp.emc.com | 208.91.112.53 | 3 | 0:00:15 | 883 | 7.21 | canada |
| | retina.corp.emc.com | 172.16.16.100 | 3 | 0:10:25 | 79 | 7.13 | internal? |
| | USSAMURPHJ211C.corp.emc.com | 66.35.48.24 | 3 | 0:01:35 | 22 | 7.02 | US |
| | workl-w.corp.emc.com | 66.35.48.24 | 3 | 0:01:35 | 46 | 7.02 | US |
| | Judis-MacBook-Air.local | 208.91.112.53 | 3 | 0:00:15 | 55 | 7.02 | canada |

FIG. 6

DETECTION OF MALWARE BEACONING ACTIVITIES

BACKGROUND OF THE INVENTION

Conventional techniques of detecting security threats include using a firewall or using an intrusion detection system. Such conventional techniques operate based on pre-defined rules and/or known signatures of unauthorized traffic. However, using static rules or known signatures are less effective against security threats whose signatures are not yet known (e.g., zero-day attacks) and/or whose behavior changes over time. It would be desirable to detect security threats in a more dynamic and holistic manner.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

One type of sophisticated security threat is the Advanced Persistent Threat (APT). Characteristics of the APT include the targeting of a specific enterprise network and the persistent nature of the targeting. For example, the behavior of the APT may change over time and become more or less active at the control of its (e.g., human) operators.

Figure 1:
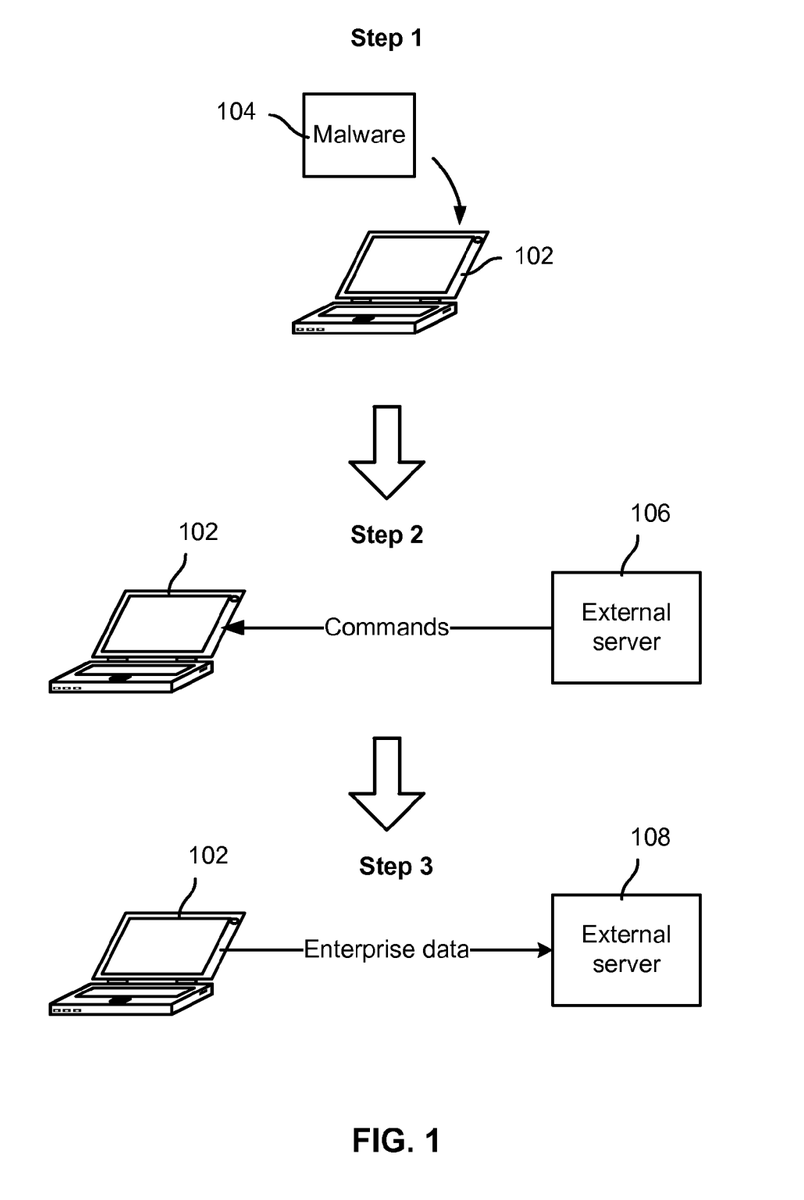
FIG. 1 shows an example of some steps of an APT and its effect on a device internal to an enterprise network.

FIG. 1 shows an example of some steps of an APT and its effect on a device internal to an enterprise network. The enterprise network may be associated with a company, school, and/or other institution. As shown in this example, one of the goals of an APT is to ultimately extract data (e.g., proprietary or otherwise important data) from the enterprise. In the example, device 102 is a device that is internal to an enterprise network. That is to say, device 102 has the appropriate software applications installed on it that could enable an authorized user to authenticate via his or her account to access the available resources (e.g., data, applications, storage) at the enterprise network. The authorized user may be an employee of the enterprise, for example. The authorized user may range from a non-administrator employee with an account associated with a relatively low level of access privileges to a senior executive or administrator with an account associated with a high level of access privileges to files of the enterprise. More than one authorized user may log on to his or her account using device 102. While device 102 is shown to be a laptop computer, other examples of device 102 include a desktop computer, a mobile device, a tablet device, or a smartphone.

In this simplified example, an APT attack may infiltrate an enterprise network in three steps. (It is possible for non-APT attacks to carry out attacks in ways similar to those described below, but for purposes of illustration, the steps are referred as being part of an APT attack.) During Step 1, malware 104 which is associated with operator(s) of the APT is installed onto device 102, which is internal to the enterprise network. The operator(s) of the APT attack may then use malware 104 installed at device 102 as an agent of the attack to control and communicate with device 102. For example, malware 104 may be installed onto device 102 via a phishing attack. For example, operator(s) of the APT may gain awareness of habits and/or interests of an authorized user of device 102 and send a phishing message to the user. Alternatively or additionally, operator(s) of the APT may target device 102 for a malware infection based on some detected security vulnerability of device 102. Once the unsuspecting user opens the message (e.g., an attachment of the message), he or she may have allowed malware included in the message (or attachment thereof) to at least install a backdoor onto the device. The operator(s) may use this backdoor to gain easier access to device 102 during future accesses (e.g., by avoiding performing authentication at device 102 during future accesses). While only one device, device 102, is shown to be compromised in this example, APT associated with malware may be installed on other internal devices as well.

During Step 2, device 102 communicates with external server 106, which is external to the enterprise network and is associated with the operator(s) of the APT attack. For example, external server 106 may be considered as a command and control server of the operator(s) of the APT attack. Through malware 104 installed at device 102, external server 106 may send and receive messages to/from device 102. Sometimes, malware 104 at device 102 may initiate communication with external server 106 (e.g., malware 104 phones "home" to external server 106 to receive further instructions)

and sometimes, external server 106 may initiate communication with malware 104 at device 102. For example, such messages may include commands that external server 106 sends to device 102 to cause device 102 to send enterprise network information (e.g., user account information for authorized users of the enterprise network, structure information regarding the resources of the enterprise network) back to external server 106. Through communication with device 102, external server 106 may be able to map out the available resources (e.g., servers, databases) of the enterprise network and retrieve user account information of authorized users with privileges to access important enterprise data (e.g., the CEO of the enterprise, information technology professionals of the enterprise), for example, to proceed with the next step of the attack. While only one device, device 102, is shown to be compromised and communicating with external server 106 in this step, other internal devices may be communicating with external server 106 as well.

During Step 3, data from the enterprise network is extracted using device 102 and transferred to external server 108. For example, using the stolen user account information of authorized users with privileges to access important enterprise data, external server 108 may instruct device 102 (e.g., via malware 104 at least in part) to access servers and/or databases with data of interest to extract such data and to transfer the data to external server 106.

By Step 3, it is possible for the APT to have stolen proprietary and/or confidential data from the enterprise, which is very harmful and irreversible for the enterprise. It would be desirable to detect the onset of an attack such as the APT during the earlier stages of the attack such as during Steps 1 or 2 to preempt the loss of data or the occurrence of other malicious activities at the enterprise network. Detection of the presence of a security threat at an enterprise network may be achieved at least in part by detecting for anomalous communication between a device internal to the enterprise network with a destination (e.g., an internet protocol (IP) address) that is external the enterprise network. Such anomalous communication may be indicative of malware beaconing activity at the internal device (i.e., the presence of malware at the internal device and where the malware is communicating with an external server), which may be part of a bigger security threat. Detecting malware beaconing activity is described below.

Figure 2:
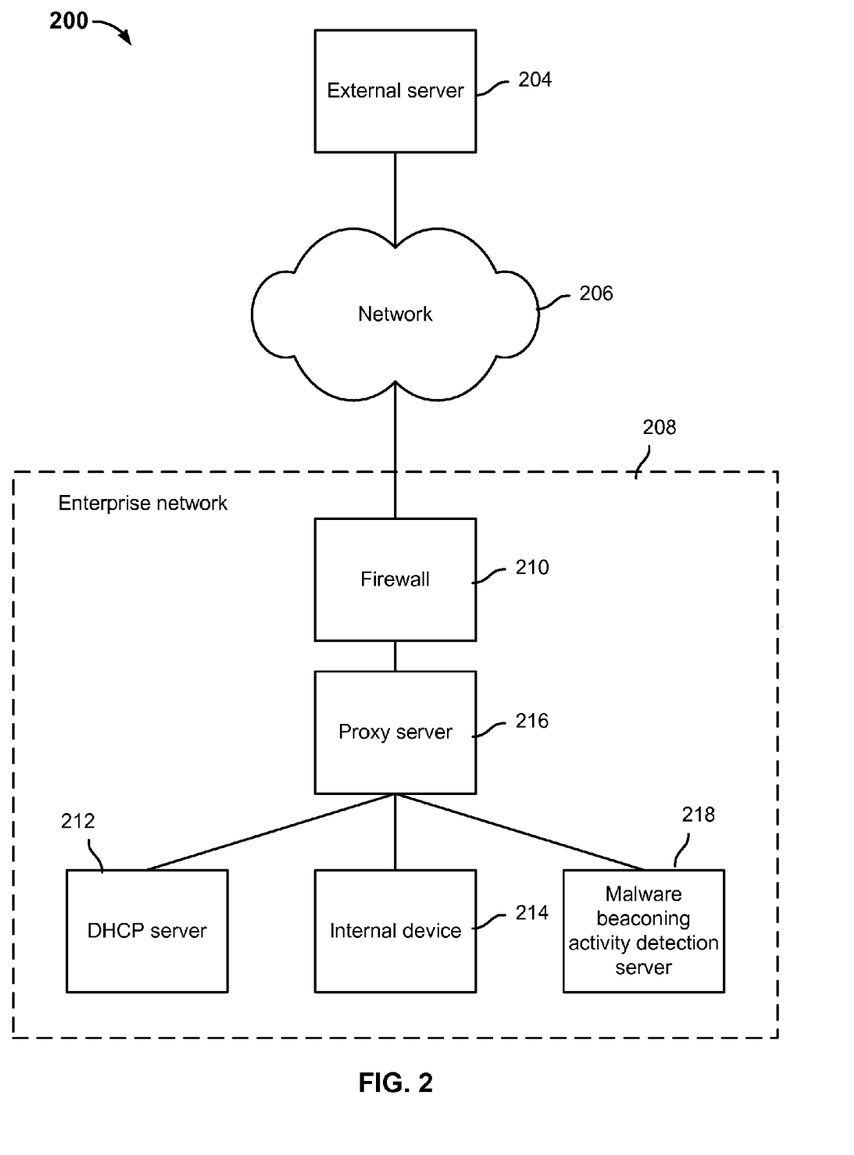
FIG. 2 is a diagram showing an embodiment of a system for detecting malware beaconing activity.

FIG. 2 is a diagram showing an embodiment of a system for detecting malware beaconing activity. In the example, system 200 includes external server 204, network 206, enterprise network 208, firewall 210, dynamic host configuration protocol (DHCP) server 212, internal device 214, proxy server 216, and malware beaconing activity detection server 218. Network 206 may include high-speed telecommunications and/or data networks. External servers 204 may comprise any servers that are not included within enterprise network 208.

Enterprise network 208 may be associated with an enterprise (e.g., a company, school, and/or other institution) and may provide network services for users who are affiliated with the enterprise. While the example shows only external server 204, enterprise network 208 may communicate with any number of external servers. External server 204 may be identified by at least an associated IP address.

Enterprise network 208 includes firewall 210, proxy server 216, DHCP server 212, internal device 214, and malware beaconing detection server 218. Firewall 210, DHCP server 212, internal device 214, proxy server 216, and malware beaconing detection server 218 are exemplary devices within enterprise network 208 and enterprise network 208 may include more or fewer devices. Within enterprise network 208, firewall 210 is configured to filter out non-HTTP messages that are detected to not meet the specified security criteria, DHCP server 212 is configured to dynamically assign IP addresses that are internal the enterprise network 208 to resources internal (e.g., to the media access control (MAC) addresses thereof) to enterprise network 208 (e.g., internal device 214), proxy server 216 is configured to filter out HTTP messages that are detected to not meet filter criteria, and internal device 214 is configured to run applications and/or provide access to files associated with the enterprise to one or more users associated with appropriate security privileges (e.g., a user who submits the appropriate credentials to be authenticated). Firewall 210, DHCP server 212, and proxy server 216 all assist internal device 214 (as well as other internal devices) in communicating with resources outside of enterprise network 208 such as external server 204. For example, when sending a message to external server 204, internal device 214 may include in the message a dynamically assigned internal IP address assigned to it by DHCP server 212 as a source address and an external IP address associated with external server 204 as the destination address. In various embodiments, "internal IP address" refers to an IP address used within an enterprise network and an "external IP address" refers to an IP address used that is outside of the enterprise network. If the outgoing message is a HTTP message, then it may be examined by proxy server 216 and if the message is a non-HTTP message, then it may be examined by firewall 210 before it may be delivered to external server 204 based on the destination address of the message. Likewise, when a message is sent from external server 204, the external IP address of external server 204 is included in the message as a source address and the dynamically assigned internal IP address of internal device 214 is included as the destination address. If the incoming message is a HTTP message, then it may be examined by proxy server 216 and if the message is a non-HTTP message, then it may be examined by firewall 210 before it may be delivered to internal device 214 based on the destination address of the message.

Traffic that enters enterprise network 208 with an internal destination address and leaves enterprise network 208 for an external destination may in part be documented by logs stored by or on behalf of resources within enterprise network 208 such as one or more of firewall 210, proxy server 216, and DHCP server 212. Firewall logs associated with firewall 210 indicate at least the external IP address, dynamically assigned internal IP address of non-HTTP network traffic, source port, destination port, and protocol used. Proxy logs associated with proxy server 216 indicate at least the external IP address, dynamically assigned internal IP address of HTTP network traffic, source port, destination port, and protocol used. DHCP logs associated with DHCP server 212 indicate at least the dynamically assigned internal IP address and an internal device (e.g., the MAC address of the internal device) associated with network traffic. Due to the dynamic nature of internal IP address assignments with DHCP server 212, a particular internal IP address may not be consistently mapped to a single internal device, so it is desirable to use DHCP logs to identify the appropriate interval device (host) to which a dynamic internal IP address is assigned, as opposed to creating a static mapping between internal IP addresses and internal devices.

Malware beaconing activity detection server 218 is configured to detect malware beaconing activities on one or more devices internal to enterprise network 208 such as internal device 214. In various embodiments, malware beaconing activities includes communication between a malware agent that is installed at an internal device with one or more external servers associated with the intent to attack (or has already attacked and is engaging in further attacks on) the enterprise network. One concern is that such communication might potentially lead to (or has already led to) security breaches (e.g., theft of proprietary data) at the enterprise network. An example of malware beaconing activities includes what occurs during Step 2 of an APT attack, such as illustrated above and in FIG. 1, where malware 104 installed at device 102 phones "home" to external server 106 that is associated with malicious activities. The presence of malware on internal devices such as internal device 114 is difficult to definitively ascertain because, for example, identifying characteristics (e.g., signatures) of the malware may not yet be known. However, indications of the potential presence of malware beaconing activities may be discerned from anomalous communications between internal devices and external destinations.

In various embodiments, malware beaconing activity detection server 218 is configured to store logs associated with communications between internal devices and external servers to detect anomalies among them. The anomalies may be flagged and further analyzed for the detection of malware at any of the internal devices that are associated with the flagged anomalies and/or the presence of an external destination (e.g., external IP address) that is potentially associated with a security threat. To detect such anomalies, in various embodiments, malware beaconing activity detection server 218 is configured to use stored firewall logs, proxy logs, and/or DHCP logs to generate conversations between internal devices and external destinations using such logs. In various embodiments, a "conversation" refers to a series of communication events between an internal device and an external destination. In analyzing the stored conversations, malware beaconing activity detection server 218 may determine which of such conversations are anomalous and therefore warrant further analysis. In some embodiments, because of the vast amount of stored logs that malware beaconing activity detection server 218 must analyze, malware beaconing activity detection server 218 may be implemented as a massively parallel processing system. In some embodiments, malware beaconing activity detection server 218 may determine a geolocation associated with each conversation to give the conversation further context. The conversations that malware beaconing activity detection server 218 flags as being anomalous may be stored and in some embodiments, presented. In some embodiments, if after an anomalous conversation is analyzed it is determined that malware is very likely present on the internal device associated with the conversation, then remedial action may be taken (e.g., by removing the compromised internal device from the enterprise network and therefore closing off the malware backdoor activity at the device).

By using malware beaconing activity detection server 218 to determine anomalous conversations between internal devices such as internal device 214 and external servers such as external server 204, anomalous activity at one or more internal devices that is part of a larger security attack (e.g., an APT) may be detected and hopefully, during the earlier stages of an attack, so as to prevent further and more serious security breaches (e.g., theft of proprietary enterprise data).

Figure 3:
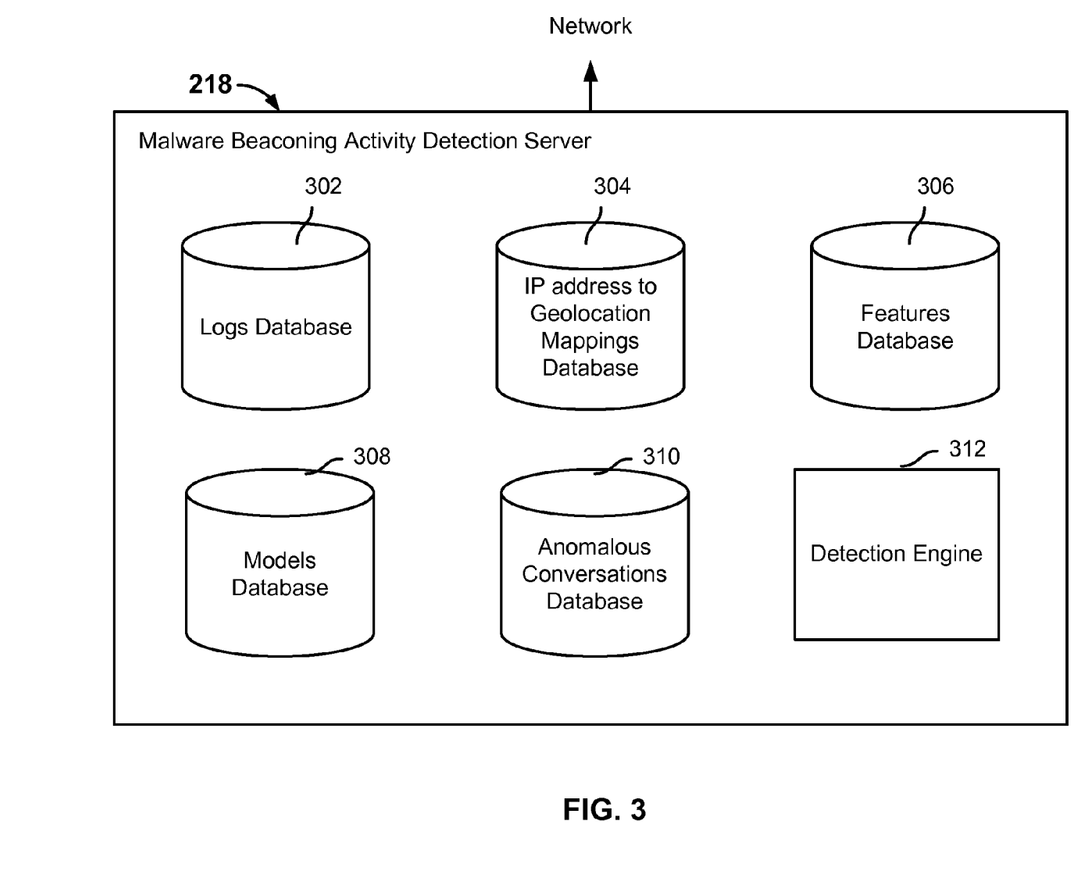
FIG. 3 is a diagram showing an embodiment of a malware beaconing activity detection server.

FIG. 3 is a diagram showing an embodiment of a malware beaconing activity detection server. In some embodiments, malware beaconing activity detection server 218 of system 200 may be implemented using the example of FIG. 3. In the example, the malware beaconing activity detection server includes logs database 302, IP addresses to geolocation mappings database 304, features database 306, models database 308, anomalous conversations database 310, and detection engine 312. Each of logs database 302, IP address to geolocation mappings database 304, features database 306, models database 308, and anomalous conversations database 310 may be implemented with one or more databases. Detection engine 312 may be implemented using one or both of hardware and software.

Logs database 302 is configured to store logs associated with communications between internal device(s) within an enterprise network and one or more external destinations outside of the enterprise network. In some embodiments, logs database 302 is configured to store firewall logs, DHCP logs, and/or proxy logs. As mentioned above, firewall logs may indicate at least the correspondence between an internal IP address and an external IP address for non-HTTP traffic, proxy logs may indicate at least the correspondence between an internal device and an external IP address for HTTP traffic, and DHCP logs may indicate at least the correspondence between an assignment of an internal IP address and an internal device. In some embodiments, the stored logs also indicate attributes of the network traffic such as, for example, whether the data of the traffic was encrypted, the service provided by the server associated with the external IP address, the size of the data included within the traffic, and the type (e.g., standard or non-standard) of the port. In some embodiments, each log stored at logs database 302 is stored with a time indication associated with when the traffic occurred or when the log was created.

In some embodiments, detection engine 312 is configured to correlate the stored firewall, DHCP, and proxy logs at logs database 302 to generate a set of conversations, where each conversation comprises a series of communication events between an internal device and an external IP address. For example, to generate a conversation, detection engine 312 may find communication events that include pairs of an internal source IP address and an external destination IP address in stored firewall logs or proxy logs. From DHCP log, an internal device (e.g., identified by a MAC address) assigned with the source internal source IP address can be identified. In some embodiments, a communication event includes at least an internal device, the external IP address, the time of connection, a port of the source IP address, a port of the destination IP addresses, and the protocol used In some embodiments, a conversation comprises a series of communication events between a pair of an internal device and an external IP address. Then, information associated with communication events in a conversation may be merged together to generate the attributes for a conversation. In some embodiments, the attributes of each conversation includes, for example, a time indication (e.g., the date or time period) over which the conversation took place and entropy of inter-communication time between successive (consecutive) communication events during the conversation. In some embodiments, the inter-communication time between successive communication events refers to the time elapsed between the time of occurrence of one communication event in the conversation and the time of occurrence of a subsequent communication event in the conversation between the same internal device and external IP address. Attributes of conversations other than those described above may be determined and stored as well. In various embodiments, the conversations and their associated attributes generated based on the stored logs are also stored at logs database 302. In some embodiments, logs database 302 is continually updated with new logs (e.g., firewall, proxy, DHCP) as more logs are generated. In some embodiments, conversations are continually generated based on new logs as well.

In some embodiments, each generated conversation is stored with a geolocation associated with the external IP address. IP address to geolocation mappings database 304 is configured to store known IP address to geolocations. In some embodiments, a mapping between an IP address may correspond to one or more geolocations at one or more granularities. For example, an IP address may be mapped to the country of South Korea or the city of Seoul of the county South Korea. Detection engine 312 is configured to determine a geolocation for the external IP address of each stored conversation at logs database 302 based on the mappings of IP address to geolocation mappings database 304.

Features database 306 is configured to store features associated with characterizing potential malware beaconing activities. Generally, feature extraction is a technique that maps input information to a reduced set of information (i.e., features, which can be represented by mathematical vectors) such that the input information can be accurately recognized or classified based on the reduced representation of features. A feature is a variable that is used to represent a characteristic of the input information. Features are selected and defined by designers of a feature extraction to help decode/classify the input information, distinguish and/or disambiguate the input information, and/or accurately map the input information to the output values. As applied to the present application, feature extraction is used to analyze conversations between internal devices of an enterprise network and external IP addresses. In some embodiments, features are designed to capture characteristics of a conversation that could indicate whether the conversation is anomalous (i.e., an anomalous conversation is considered as potentially being associated with malware beaconing activities between an internal device and an external IP address). In some embodiments, the corresponding values of the set of determined features are extracted (and placed into one or more feature vectors) for each conversation (and the stored attributes for the conversation) from, for example, the conversation itself, a set of conversations (that may or may not include the conversation under consideration), stored (e.g., firewall, proxy, and/or DHCP) logs, information associated with internal devices, stored information associated with IP addresses, correlated data based on communications associated with either or both the internal device and the external IP address, or attributes associated with conversations, or any other appropriate set of data. The set of extracted feature values that represent the conversation is then processed by one or more statistical models associated with the set of features to determine whether the conversation is anomalous (e.g., relative to the internal device or associated with the internal device).

Examples of features that may be stored at features database 306 include:

How old is this conversation? For example, this feature may be determined based on the time elapsed between the first occurrence of the conversation and the present time.

How old is this internal device of this conversation? For example, this feature may be determined based on the time elapsed between the first occurrence of the device from any past conversation and the time of this conversation.

How old is this external IP address of this conversation? For example, the age of the external IP address may be determined based on the time elapsed between the first occurrence of the external IP address from any past conversation and the time of this conversation.

How likely is a particular inter-communication time value of a conversation between a source internal device and external IP address? For example, given all inter-communication time of a conversation, $\{t_1, t_2, \ldots t_i \ldots t_N\}$ between the source internal device and external IP address (e.g., $\{t_1=2$ minutes, $t_2=2$ minutes, $t_3=5$ minutes, $t_4=2$ minutes$\}$ for N=4). For an inter-communication time value the probability of its occurrence is calculated by dividing the number of its occurrence by total number of inter-communication time N (e.g., the probability for 2 minutes is ¾, the probability for 5 minutes is ¼).

What is the entropy of inter-communication time between a source internal device and external IP address? For example, between a source internal device and an external IP address, the probability of the inter-communication time values for each conversation is first calculated (e.g., referring back to the previous example, ¾ for 2 minutes, ¼ for 5 minutes). Entropy is then derived in a standard way (e.g., $-(¾*\log(¾)+⅓*\log(¼))$). (Low entropy of an inter-arrival time may be an indication of highly periodic conversations).

Is the conversation periodic? If so, what is the inter-conversation time? For example, the conversation may be determined to be periodic if after every X amount of time, another conversation associated with the same internal device and external IP address is received.

Which geolocation is associated with the external IP address? For example, the geolocation associated with the external IP address may be determined based on stored mappings between IP addresses and geolocations.

Is destination port a non-standard port?

Is the data encrypted?

Is the external IP address known to be associated with a poor reputation? For example, whether the external IP address is associated with a poor reputation may be determined by checking whether the external IP appears on a list of IP addresses of known poor reputations.

What is the service associated with the external IP address?

What is the file size transferred?

How many other external IP addresses has the internal device of this conversation communicated with in the last predefined time period (e.g., of 1 day)? For example, the number of other external IP addresses that the internal device of this conversation has communicated with may be determined by calculating the number of distinct external IP addresses from all other conversations that share the same internal device of this conversation.

How many other internal devices has the external IP address of this conversation communicated with in the last predefined time period (e.g., of 1 day)? For example, the number of other internal devices that the external IP address of this conversation has communicated with may be determined by calculating the number of distinct internal devices from all other conversations that share the same external IP of this conversation.

Models database 308 is configured to store statistical models used to process feature values extracted from the stored conversations. In some embodiments, the one or more stored statistical models are tailored to at least some of the specific features stored at features database 306. Examples of the types of models that are stored at models 308 include Naïve Bayes, neural networks, and support vector machines. In some embodiments, the models may be trained using supervised machine learning techniques or unsupervised machine learning techniques. For example, when supervised machine learning techniques are used, certain external IP addresses that are known to be associated with malicious activities are labeled as such within the sample data.

In some embodiments, each model is trained with historical conversation data to recognize such data as being "normal" (i.e., normal conversations are not anomalous and therefore not suspicious of being associated with malware beaconing activity). In some embodiments, a model may be built for each specific internal device, in which historical conversation data associated with the specific internal device is used to train the model so that the model may recognize "normal" conversation for that internal device. In some embodiments, a model may be built for a set of internal devices, in which historical conversation data associated with the internal devices of the set are used to train the model so that the model may recognize "normal" conversation for those internal devices. In some embodiments, detection engine 312 is configured to train the models with historical conversation data. The trained model can then process current conversation data to determine which of such conversations deviate from the distribution of "normal" conversations and is therefore "anomalous" (i.e., anomalous conversations are suspected as being associated with malware beaconing activities). For example, a historical time period may be predefined and the stored conversations associated with this historical time period may be used as the sample points with which to train the models. For example, each historical conversation may serve as a training data point of a N-dimensional feature vector. A current time period may be similarly predefined that includes a time period subsequent to the historical time period and the stored conversations associated with the current time period may be processed by the trained models. To process conversations associated with the current time period, a feature vector of feature values extracted for each such conversation may serve as an input to the model. The model then outputs a probability or score that describes how much the conversation deviates from the normal conversation data. In some embodiments, a threshold probability or score can be predefined for each model that can be used to determine whether the input conversation is anomalous based on the probability or score output for the conversation. The conversations that are flagged as being anomalous (and their associated attributes) are then stored at anomalous conversations database 310.

In some embodiments, the models are updated over time by being trained with updated historical data such that the models used to process current conversations are trained with conversation data from a recently past time period. As such, the models may be dynamically updated to recognize each most recent historical set of conversation data as being "normal" so that it can detect any anomalies within the most current set of conservation data.

Anomalous conversations database 310 is configured to store information associated with conversations determined by a model such as a model stored at models database 308 as being anomalous. In some embodiments, detection engine 312 is configured to detect when a model has determined that a particular conversation is anomalous and in response, to store the anomalous conversation (and associated attributes) at anomalous conversations database 310. For example, attributes stored with an anomalous conversation may include, for example, an identifier associated with an internal device, an external IP address, the feature values extracted from the conversation, the time of occurrence, and the geolocation corresponding to the external IP address. In some embodiments, detection engine 312 is configured to determine a score for each anomalous conversation that indicates the degree of risk (e.g., risk score) associated with the conversation based on the attributes and/or features associated with the anomalous conversation. In some embodiments, detection engine 312 is configured to present a list of anomalous conversations using, at least in part the stored attributes associated with the anomalous conversations and/or other information determined for the conversations. In some embodiments, in the list of presented anomalous conversations, the presented anomalous conversations are ranked based at least in part on their respective risk scores so as to prioritize the higher risk conversations earlier in the list to attract more urgent attention. In some embodiments, the list of anomalous conversations may be analyzed to determine whether malware beaconing activities are occurring with respect to an internal device and external IP address associated with an anomalous conversation. In some embodiments, in response to the determination that malware beaconing activities may be associated with a particular internal device and external IP address, remedial action may be taken such as removing the internal device from the enterprise network.

Figure 4:
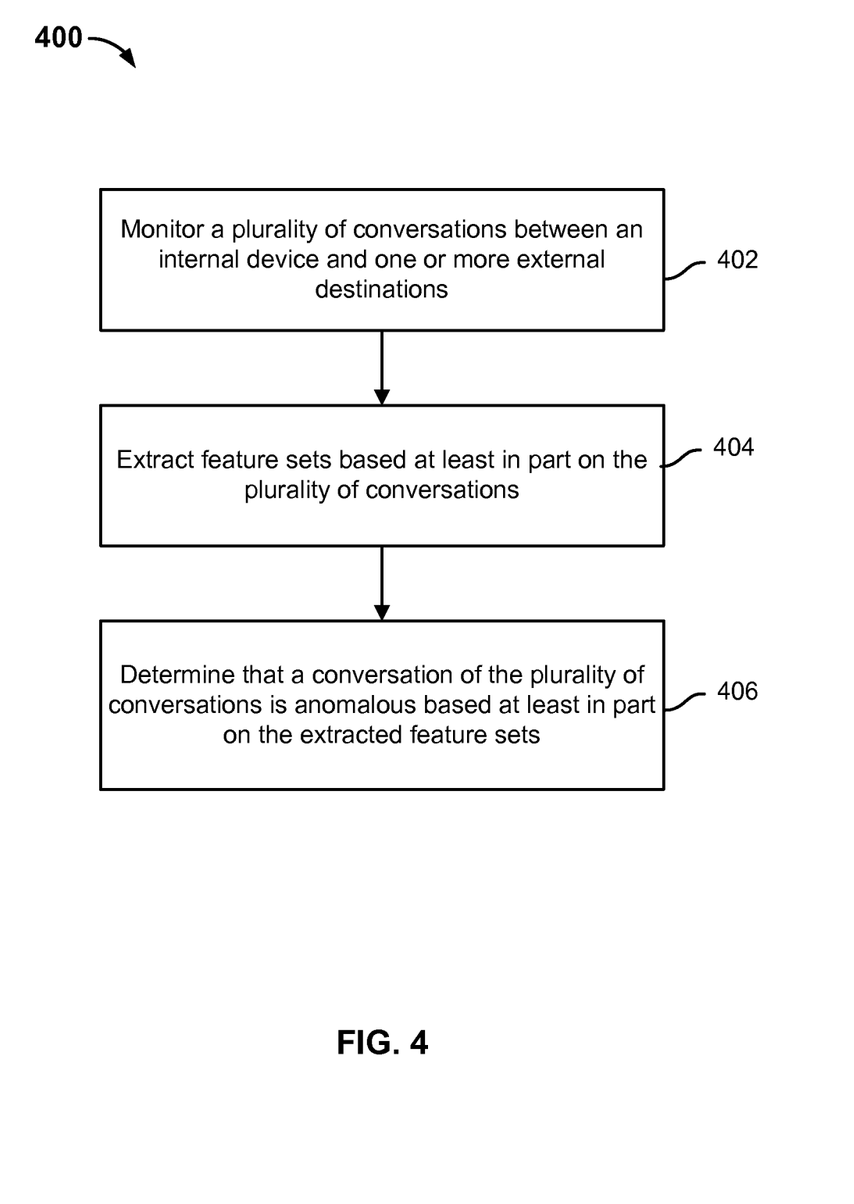
FIG. 4 is a flow diagram showing an embodiment of a process for detecting malware beaconing activity.

FIG. 4 is a flow diagram showing an embodiment of a process for detecting malware beaconing activity. In some embodiments, process 400 may be implemented at system 100.

At 402, a plurality of conversations between an internal device and one or more external destinations is monitored. In some embodiments, the internal device is internal to an enterprise network and the external destinations are external to the enterprise network. In some embodiments, each external destination may comprise an external IP address. In some embodiments, each of the plurality of conversations comprises a single connection between an internal device and an external destination. In some embodiments, the plurality of conversations are generated based on stored logs associated with the enterprise network that describe communications between internal IP addresses and external IP addresses and dynamic assignments of internal IP address to the statically assigned hardware addresses associated with the internal devices. Such logs may include firewall logs, proxy logs, and DHCP logs, for example.

At 404, feature sets are extracted based at least in part on the plurality of conversations. In some embodiments, features associated with indicating the characteristics of malware beaconing activity are designed (e.g., based at least in part on the input of security experts). In some embodiments, corresponding values of the determined features are extracted for each of the conversations and input into one or more appropriate statistical models. In some embodiments, extracting the feature sets includes mapping a dynamically assigned IP address associated with the internal device to a statically assigned hardware address (e.g., MAC address) associated with the internal device.

At 406, a conversation of the plurality of conversations is determined to be anomalous based at least in part on the extracted feature sets. In some embodiments, the model(s) are trained on historical conversation data (e.g., conversations that occurred during a period previous to the period in which the current conversation occurred), which it recognizes as being "normal" (e.g., specifically for the internal device or set of internal devices). So in processing the feature values of the conversation, the model outputs a probability or score that indicates whether the conversation deviates from the normal conversations (e.g., for that internal device if the model is built specifically for that internal device or for the set of internal devices if the model is built specifically for a set of internal devices that includes that internal device). In some embodiments, a threshold output is predefined for the model's output that is used to determine whether the conversation for which the input feature values were extracted is anomalous. For example, if the model's output for a given conversation meets or exceeds a threshold, then the conversation may be flagged as being anomalous and, in some embodiments, stored for further analysis.

Figure 5:
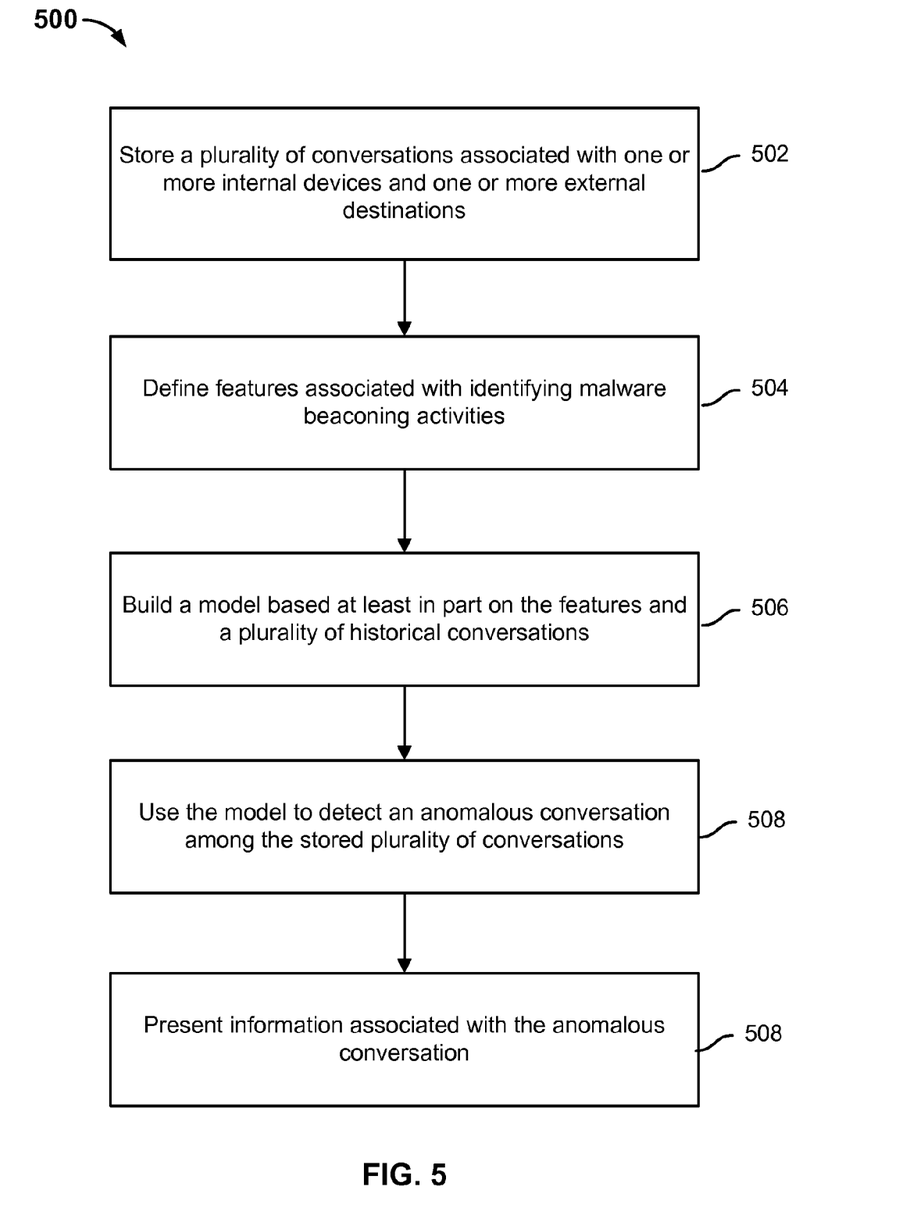
FIG. 5 is a flow diagram showing an embodiment of a process for detecting malware beaconing activity.

FIG. 5 is a flow diagram showing an embodiment of a process for detecting malware beaconing activity. In some embodiments, process 500 may be implemented at system 100. In some embodiments, process 400 may be implemented with process 500.

At 502, a plurality of conversations associated with one or more internal devices and one or more external destinations is stored. In some embodiments, the conversations are generated based on stored logs associated with an enterprise network. In some embodiments, whether an internal device may be infected with malware that is communicating with an external server associated with potentially malicious activity may be detected by monitoring the communication events logged at the enterprise network. At 504, features associated with identifying malware beaconing activities are defined. For example, defined features may include the age of the internal device and age of the external IP address. At 506, a model based at least in part on the features and a plurality of historical conversations is built. In some embodiments, the model is a statistical model that is trained with sample feature values extracted from conversations associated with a predefined historical time period. Returning to the previous example, after training the model with historical conversations, the model may recognize a conversation with a relatively older internal device age but very young external IP address age and with low entropy of communication time as being more likely to be anomalous. Intuitively, an older internal device that is suddenly communicating with a younger external IP address and with low entropy of communication time may indicate that the internal device has been recently infected with malware that is phoning home to the external IP address. At 508, the model is used to detect an anomalous conversation among the stored plurality of conversations. At 510, information associated with the anomalous conversation is presented. In some embodiments, a list of anomalous conversations are presented and ranked based at least on their respective scores. In some embodiments, a score is determined for each anomalous conversation based on the conversation's attributes. In some embodiments, an anomalous conversation's score comprises the score output by the model that processed it. In some embodiments, information presented that is associated with an anomalous conversation may include the internal device identifier, the external IP address, and the geolocation associated with the external IP address.

Figure 6:
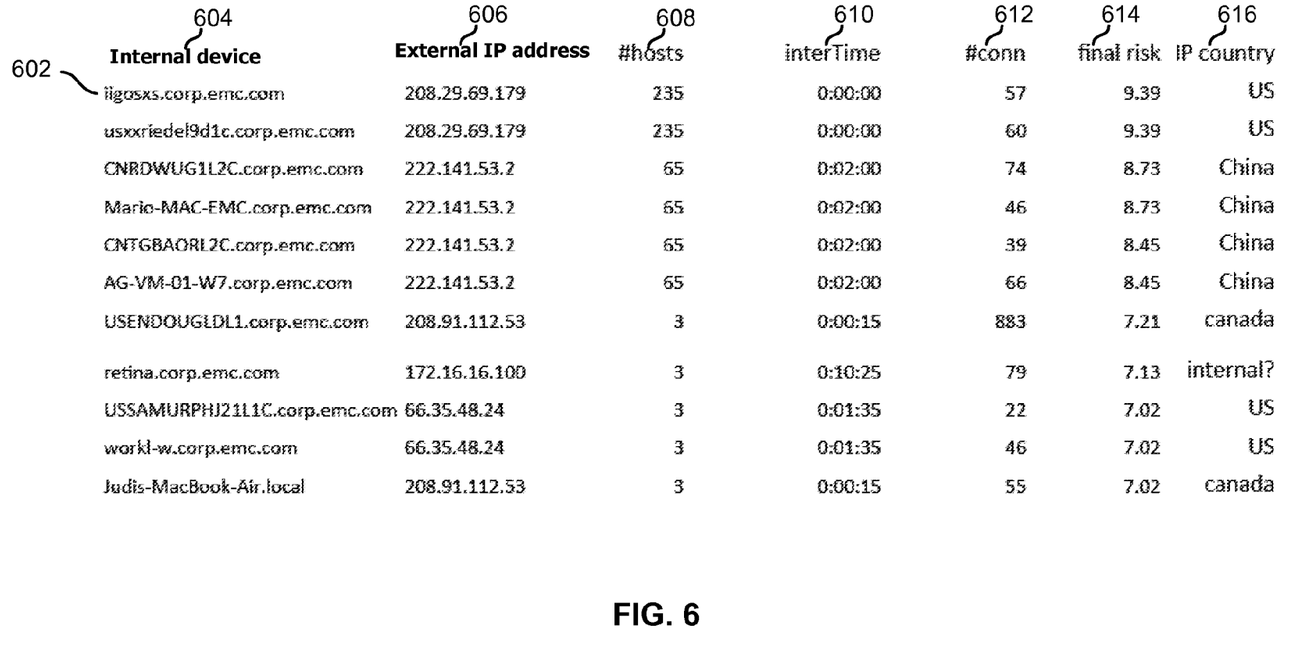
FIG. 6 is a diagram showing a list of anomalous conversations ranked based their respective risk scores.

FIG. 6 is a diagram showing a list of anomalous conversations ranked based their respective risk scores. In the example, each row represents an anomalous conversation and its associated data (e.g., some of the features extracted for the conversation). In some embodiments, some of the data presented with an anomalous conversation was stored with the conversation, while some other of data presented is determined based on a set of conversations (anomalous or not) that includes the conversation. In this example, the anomalous conservations were determined based on monitoring the conversations of an enterprise network that is associated with the company EMC®. In the example, each row represents a conversation that was determined to be anomalous by a process such as 400 or 500. Column 604 (labeled "Internal device") includes identifiers associated with internal devices within an enterprise network. Column 606 (labeled "External IP address") includes external IP addresses with which the internal device of the same row had engaged in the conversation. Column 608 (labeled "#hosts") includes the number of internal devices to which the external IP address of the same row had connected to during the current day and which, just a week ago, had connected to zero internal devices. Column 610 (labeled "interTime") includes the most probable (the case for over 90% of the time) inter-communication time (within a margin of error of 5 seconds) between consecutive communication events of the conversation. Column 612 (labeled "#conn") includes the number of communication events associated with the most probable interTime for the conversation. Column 614 includes final risk scores of conversations, in which a greater final risk score indicates that the conversation is more potentially indicative of the presence of malware beaconing activity. So, anomalous conversations are listed by their final risk scores because anomalous conversations associated with higher final risk scores are to be analyzed first for any remedial action that may need to be taken as a result of the presence of the conversation. Column 616 includes identifiers that include the country to which the external IP address maps. As shown in the example, conversation 602 comprises a conversation that took place between internal device "iigosxs.corp.emc.com" and external IP address "208.29.69.179." Whereas just a week ago, the external IP address of conversation 602 did not connect to any other internal devices, during the current day, the external IP address has connected to 235 internal devices, which is a significant jump. Furthermore, the most probable inter-communication time for conversation 602 was approximately zero seconds, which means that the consecutive communication events in conversation 602 most likely immediately followed each other. Also, the number of communication events of conversation 602 that were associated with approximately zero seconds of inter-communication time was 57. The country associated with the external IP address of conversation 602 is the United States. Based at least in part on these attributes of conversation 602, the final risk of 9.39 determined for conversation 602 is the highest among the other anomalous conversations and therefore presented first. If internal device "iigosxs.corp.emc.com" is determined to be performing malware beaconing activities, then the device may be removed from the EMC enterprise network so as to attempt to prevent any further security breaches.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A malware beaconing detection system, comprising:
    a processor configured to:
        identify a plurality of conversations between an internal device and one or more external destinations, wherein at least some of the plurality of conversations are determined from stored logs associated with communication between one or more internal devices associated with an enterprise network and the one or more external destinations, wherein identifying a first conversation of the plurality of conversations between a pair comprising the internal device and a first external destination of the one or more external destination comprises to:
            obtain a plurality of communication events among the stored logs that includes the pair comprising the internal device and the first external destination, wherein to obtain a communication event that includes the pair comprising the internal device and the first external destination includes to:

identify traffic between a dynamically assigned Internal Protocol (IP) address and the first external destination; and determine that the dynamically assigned IP address maps to a statically assigned address associated with the internal device; and generate the first conversation between the pair comprising the internal device and the first external destination based at least in part on the plurality of communication events;

extract feature sets based at least in part on the plurality of conversations; and determine that a conversation of the plurality of conversations is anomalous based at least in part on the extracted feature sets; and a memory coupled to the processor and configured to store the extracted feature sets.

2. The system of claim 1, wherein at least one of the one or more external destinations comprises an external IP address outside of the enterprise network.

3. The system of claim 1, wherein the at least some of the plurality of conversations are determined based at least in part on stored logs comprising one or more of the following: firewall logs, proxy logs, and dynamic host configuration protocol (DHCP) logs.

4. The system of claim 1, wherein the anomalous conversation is potentially indicative of malware being present at the internal device.

5. The system of claim 1, wherein to determine that the conversation is anomalous includes building a model based at least in part on at least some of the feature sets and a plurality of historical conversations.

6. The system of claim 5, wherein at least some of the extracted feature sets are input into the model and the model is configured to determine that the conversation is anomalous based on the inputted feature sets.

7. The system of claim 1, wherein one of the feature sets includes a feature associated with an age of the internal device.

8. The system of claim 1, wherein one of the feature sets includes a feature associated with an age of one of the one or more external destinations.

9. The system of claim 1, wherein one of the feature sets includes a feature associated with a service associated with one of the one or more external destinations.

10. The system of claim 1, wherein one of the feature sets includes a feature associated with a geolocation of one of the one or more external destinations.

11. The system of claim 1, wherein the processor is further configured to present information associated the anomalous conversation.

12. The system of claim 1, wherein identifying the first conversation further includes the processor being further configured to store attributes associated with the plurality of communication events, the internal device, and the first external destination with the first conversation, and wherein extracting feature sets includes the processor being further configured to extract a feature set from the attributes associated with the first conversation.

13. A method for malware beaconing detection, comprising:

identifying a plurality of conversations between an internal device and one or more external destinations, wherein at least some of the plurality of conversations are determined from stored logs associated with communication between one or more internal devices associated with an enterprise network and the one or more external destinations, wherein identifying a first conversation of the plurality of conversations between a pair comprising the internal device and a first external destination of the one or more external destination comprises:

obtaining a plurality of communication events among the stored logs that includes the pair comprising the internal device and the first external destination, wherein to obtain a communication event that includes the pair comprising the internal device and the first external destination includes:

identifying traffic between a dynamically assigned Internal Protocol (IP) address and the first external destination; and determining that the dynamically assigned IP address maps to a statically assigned address associated with the internal device; and generating the first conversation between the pair comprising the internal device and the first external destination based at least in part on the plurality of communication events;

extracting feature sets based at least in part on the plurality of conversations; and determining, using a processor, that a conversation of the plurality of conversations is anomalous based at least in part on the extracted feature sets.

14. The method of claim 13, wherein at least some of the plurality of conversations are determined based at least in part on stored logs comprising one or more of the following: firewall logs, proxy logs, and dynamic host configuration protocol (DHCP) logs.

15. The method of claim 13, wherein determining that the conversation is anomalous includes building a model based at least in part on at least some of the feature sets and a plurality of historical conversations.

16. The method of claim 15, wherein at least some of the extracted feature sets are input into the model and the model is configured to determine that the conversation is anomalous based on the inputted feature sets.

17. The method of claim 13, further comprising presenting information associated the anomalous conversation.

18. A computer program product for malware beaconing detection, the computer program product being embodied in a non-transitory computer readable storage medium and comprising computer instructions for:

identifying a plurality of conversations between an internal device and one or more external destinations, wherein at least some of the plurality of conversations are determined from stored logs associated with communication between one or more internal devices associated with an enterprise network and the one or more external destinations, wherein identifying a first conversation of the plurality of conversations between a pair comprising the internal device and a first external destination of the one or more external destination comprises:

obtaining a plurality of communication events among the stored logs that includes the pair comprising the internal device and the first external destination, wherein to obtain a communication event that includes the pair comprising the internal device and the first external destination includes:

identifying traffic between a dynamically assigned Internal Protocol (IP) address and the first external destination; and determining that the dynamically assigned IP address maps to a statically assigned address associated with the internal device; and generating the first conversation between the pair comprising the internal device and the first external destination based at least in part on the plurality of communication events;
extracting feature sets based at least in part on the plurality of conversations; and
determining that a conversation of the plurality of conversations is anomalous based at least in part on the extracted feature sets.

\* \* \* \* \*

UNITED STATES PATENT AND TRADEMARK OFFICE
CERTIFICATE OF CORRECTION

PATENT NO.         : 9,038,178 B1
APPLICATION NO.    : 13/532385
DATED              : May 19, 2015
INVENTOR(S)        : Derek Lin Page 1 of 1

It is certified that error appears in the above-identified patent and that said Letters Patent is hereby corrected as shown below:

In the Claims

Claim 11
Column 13, line 50, delete "associated the" and insert -- associated with the --

Claim 14
Column 14, line 27, delete "wherein at" and insert -- wherein the at --

Claim 17
Column 14, line 41, delete "associated the" and insert -- associated with the --

Signed and Sealed this
Second Day of February, 2016

Michelle K. Lee
*Director of the United States Patent and Trademark Office*